(12) United States Patent
Hayot

(10) Patent No.: US 9,884,527 B2
(45) Date of Patent: *Feb. 6, 2018

(54) SKID AID

(71) Applicants: Louis H. Callard, Gainesville, FL (US); Alexandre Hayot, Baie-Mahault (FR)

(72) Inventor: Alexandre Hayot, Baie-Mahault (FR)

(73) Assignees: Alexandre Hayot, Baie-Mahault (FR); Louis Callard, Gainesville, FL (US)

( * ) Notice: Subject to any disclaimer, the term of this patent is extended or adjusted under 35 U.S.C. 154(b) by 868 days.

This patent is subject to a terminal disclaimer.

(21) Appl. No.: 14/082,773

(22) Filed: Nov. 18, 2013

(65) Prior Publication Data

US 2014/0069559 A1    Mar. 13, 2014

Related U.S. Application Data

(63) Continuation of application No. 12/524,922, filed as application No. PCT/IB2008/000654 on Jan. 31, 2008, now Pat. No. 8,584,720.

(30) Foreign Application Priority Data

Jan. 31, 2007    (CH) ...................................... 0163/07

(51) Int. Cl.
  *B60C 11/02*    (2006.01)
  *B60C 27/06*    (2006.01)
  (Continued)

(52) U.S. Cl.
  CPC .............. *B60C 27/06* (2013.01); *B60B 15/00* (2013.01); *B60C 11/00* (2013.01); *B60C 11/02* (2013.01);
  (Continued)

(58) Field of Classification Search
  CPC ....... B60C 11/02; B60C 27/06; B60C 27/065; B60C 27/16
  See application file for complete search history.

(56) References Cited

U.S. PATENT DOCUMENTS 1,487,165 A * 3/1924 Jacobson ................ B60C 27/16
                                                         152/189
3,768,535 A    10/1973 Holden
                       (Continued)

FOREIGN PATENT DOCUMENTS

AU            236346        6/1959
AU            236346 A *    6/1959
              (Continued)

OTHER PUBLICATIONS

Machine translation for France 2,873,327 (no date).*
Machine translation for FR 858,389 (no date).
Partial translation for Japan 58-044202 U (no date).

*Primary Examiner* — Steven D Maki
(74) *Attorney, Agent, or Firm* — Saliwanchik, Lloyd & Eisenschenk

(57) ABSTRACT

Annular tire overlay (11) for drawing onto the rolling surface of tires (40), which has a tread (17) on its outside and a gripping surface (15) on its inside, which tire overlay (11) is so designed that contact between the rolling surface of the tire (40) and the surfacing of the road is prevented by the tire overlay (11) when the tire overlay has been drawn onto a tire. The said tire overlay (11) is provided with a flange (21) which stops the tire overlay (11) from shifting in the axial direction of the wheel. Advantageously, the tire overlay is additionally stiffened by a flange (21) of planar form to keep the contact area on the surface below small.

12 Claims, 2 Drawing Sheets

(51) Int. Cl.
  *B60B 15/00*  (2006.01)
  *B60C 11/00*  (2006.01)
  *B60C 19/00*  (2006.01)

(52) U.S. Cl.
  CPC ............ *B60C 19/00* (2013.01); *B60C 27/065* (2013.01); *Y10T 152/10* (2015.01); *Y10T 152/10279* (2015.01)

(56) References Cited

U.S. PATENT DOCUMENTS

| | | | |
|---|---|---|---|
| 4,098,313 A | | 7/1978 | Ingerson |
| 4,747,437 A | | 5/1988 | Magee |
| 5,044,411 A | | 9/1991 | Doll |
| 8,584,720 B2 * | | 11/2013 | Hayot .................... B60C 11/02 152/151 |
| 2001/0050125 A1 | | 12/2001 | Nelses |

FOREIGN PATENT DOCUMENTS

| | | | |
|---|---|---|---|
| CA | 2 013 777 | | 10/1991 |
| CA | 2212036 A1 | * | 2/1999 |
| DE | 804 162 | | 4/1951 |
| FR | 715 150 | | 11/1931 |
| FR | 858389 A | | 11/1940 |
| FR | 2 800 013 | | 4/2001 |
| FR | 2873327 A1 | * | 1/2006 |
| GB | 6842 A | * | 0/1911 |
| GB | 2 143 482 | | 2/1985 |
| GR | 71142 B | | 10/1983 |
| JP | 58-044202 U | | 3/1983 |
| WO | WO 1985/05597 | | 12/1985 |
| WO | WO 1998/23660 | | 6/1998 |
| WO | WO 2005/110778 | | 11/2005 |
| WO | WO 2006/018566 | | 2/2006 |
| WO | WO 2006/048510 A1 | | 5/2006 |
| WO | WO-2006/048510 A1 | * | 5/2006 |
| WO | WO-2006/123498 A1 | * | 11/2006 |

* cited by examiner

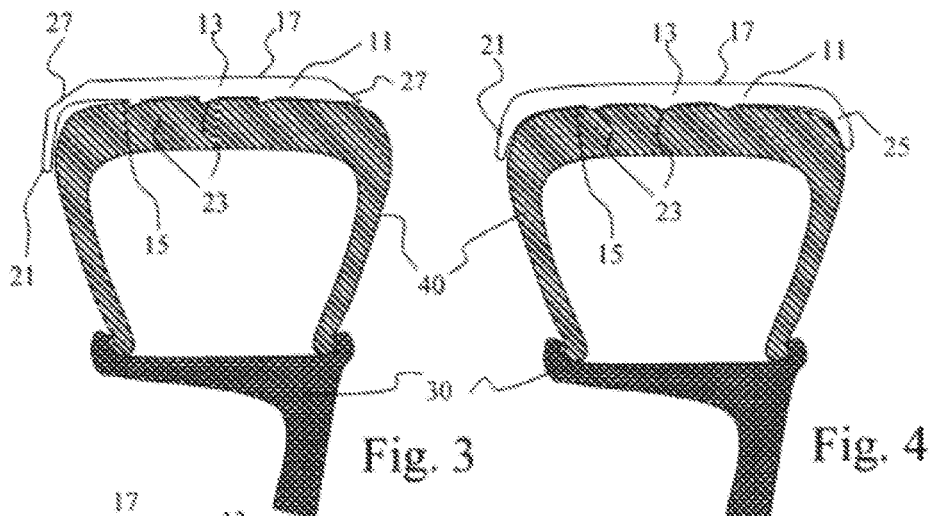
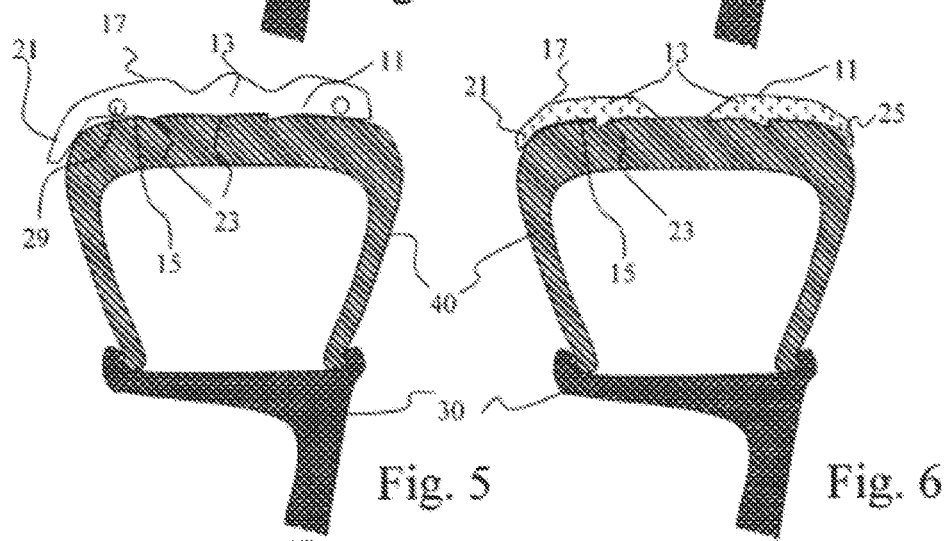
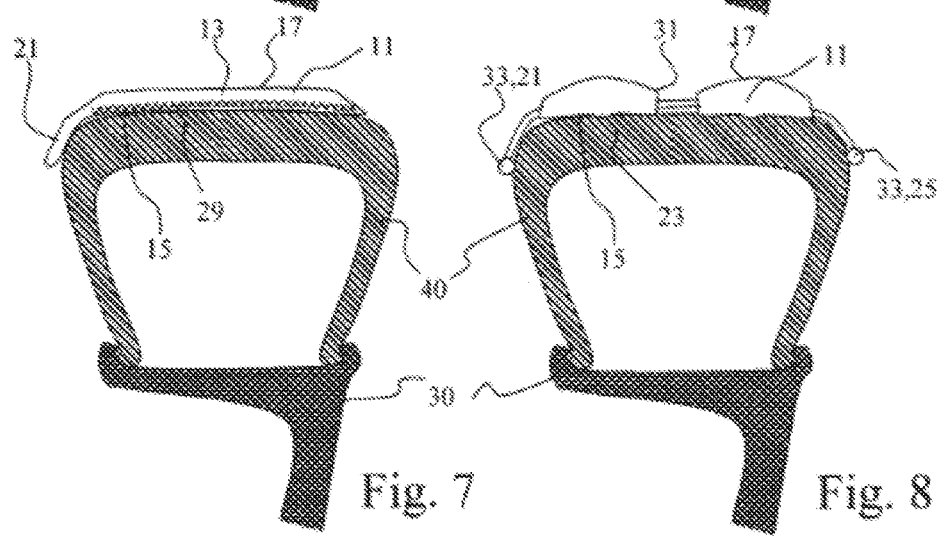

SKID AID

CROSS-REFERENCE TO RELATED APPLICATIONS

This application is a continuation of U.S. Ser. No. 12/524,922, fled Jul. 29, 2009, which is the U.S. national stage application of International Patent Application No. PCT/IB2008/000654, filed Jan. 31. 2008, the disclosures of which are hereby incorporated by reference in their entirety, including all figures and tables.

TECHNICAL FIELD OF THE INVENTION

The invention relates to a skid aid for motor cars. To enable people to learn to control motor cars when they are sliding or breaking away, there are training courses on skidding. On these courses, skids are brought about deliberately and, as far as possible, under control. Skid pans are set up to allow this to be learnt, Skid pans are given special surfacings which, when wet, provide appreciably less friction for the rubber of the types of a vehicle than the usual surfacings for roads such as asphalt or concrete. Such surfacings are suitable only for circuits intended for training in skidding and are tied to a particular location and cost-intensive to produce.

Known from WO 2006/018566 are a device for reproducing driving conditions on a slippery road for a wheeled vehicle and a method of fitting the device. The device comprises a tread strip which is detachable from the wheel of the vehicle and whose adhesion is less than the adhesion of the wheel of the vehicle. The tread strip is drawn onto a deflated tyre. After this, the tyre is pumped up. The surface of the tread strip then forms the surface which makes contact with the surface below and the tyre is no longer in direct contact with the surface below. Polyurethane is proposed as a material tier the tread strip. On the inside, the surface of the tread strip is intended to be of a form such that it is able to engage in the tread of the tyre. A disadvantage of this device is that it cannot be fixed in place on the tyre with sufficient security unless the tread strip and the tyre have patterns which are matched to one another and which will engage in one another.

OBJECT OF THE INVENTION

It is an object of the invention to provide a skid aid of the kind represented by a tread strip which can be drawn onto a tyre. It is intended to enable skidding to be practised with a motor car on conventional road surfacings, e.g. on an empty car-park or on sections of road, having asphalt or concrete surfacings, which have been temporarily blocked off for the duration of a skid course. This skid aid is intended to be easy to fit and to be able to be fixed securely to the tyre.

DESCRIPTION OF THE INVENTION

This object is achieved by a tyre overlay according to claim 1.

An annular lyre overlay for drawing onto the rolling surfaces of tyres produces a skid aid which can be inexpensively produced, which can be used in an individualised way and which can be employed on any surface below. A tyre overlay of this kind has, on its outside, a tread whose friction with the road surfacing determines behaviour in a skid and, on its inside, a gripping surface which has to make a union with the tyre. The tyre overlay is so designed that contact between the rolling surface of the tyre and the road surfacing is prevented by the tyre overlay when the tyre overlay has been drawn onto a tyre. What may therefore be provided on a tyre is a single ring per tyre, or else a plurality of rings next to one another. The tread and the gripping surface may also be interrupted in the direction of travel. At the interruptions, which extend in the direction of travel or which cross the rolling surface, the rubber of the tyre is simply not allowed to come into contact with the road surfacing. In accordance with the invention, the tyre overlay then has, as a continuation of the overlay strip, a flange which can be brought into abutment with the side of the tyre. The tyre overlay is therefore L-shaped in cross-section and laterally of the tread there is thus a flange which counteracts any displacement of the tyre overlay transversely to the direction of rotation of the tyre. It may also be U-shaped in form in cross-section, which means that there are two flanges laterally of the tread which counteract any displacement of the tyre overlay transversely to the direction of rotation of the tyre.

The tyre overlay is intended for a given diameter of tyre and is of an inside diameter sized to correspond to the diameter of the tyre. The width of the tyre however may vary in this case, thus enabling the same tyre overlay to be used for tyres of different widths. However, the ring which has the tread and the gripping surface of the tyre overlay is usefully of substantially the same width as the rolling surface of the tyre for which it is made. As a result the tyre is unable to make contact with the road surfacing apart from by downward pressure and the tyre overlay does not project beyond the rolling surface of the tyre to any degree which will be a nuisance.

The gripping surface which can be brought into contact with the tyre may be patterned to ensure that a good connection is made to the tyre. This patterning of the gripping surface advantageously has teeth which, when the tyre is inflated, are pressed into the rubber of the tyre. One steep and one shallowly-sloped side are usefully formed on these teeth. The orientation of the teeth is advantageously such as to permit displacement in only one sense in the direction defined by the axis of the wheel, namely in that sense in which the flange is pressed against the side of the wheel and thus prevents displacement. The steep side prevents a displacement of the tyre overlay, transversely to the direction of travel, which would cause an increase in the distance between the flange and the tyre. The shallowly-sloped side permits a displacement of the tyre overlay, transversely to the direction of travel, which causes a decrease in the distance between the flange and the tyre. This gives the advantage that only one flange needs to be present, and this flange is pressed against the side of the tyre when the tyre overlay is placed under load. This stops the tyre overlay from detaching from the tyre when in use.

Because the tyre overlay is matched to the diameter of the tyre for which it is intended, it can be drawn onto an uninflated tyre, in which case it stays held on the tyre after the latter has been pumped up.

The tyre overlay is usefully manufactured from a plastics material which generates substantially less friction against the road surfacing than the rubber of the tyre. The friction from, and hence the skidding characteristics, of the car fitted with the tyre overlays can be acted on by the choice of material.

A suitable material for the tyre overlay is for example PVC or polyurethane. Materials which are better in respect of skidding characteristics but more expensive are for example polytetrafluoroethylene (trademark designation: Teflon®) or polyamides such as the preferred Nylon®. The tyre overlay may contain lubricants in solid form which have a low coefficient of friction and excellent abrasion resistance. A material of this kind is for example Nylatron®, NSM, a polyamide. By adjusting the components in the additives and in the plastics material, different frictional properties can be set and as long a working life as possible obtained. The tyre overlay, or rather the plastics parts of the tyre overlay which are responsible for the frictional property, are (preferably moulded. The tyre overlay may however also be wound. The tyre overlay is advantageously formed to be stiff so that only a small area of the tread comes into contact with the surface of the road.

The overlay strip is advantageously formed to be bevelled laterally such that the tread merges into a side face at an angle of between 60 and 30°. An angle which is useful for manufacture is around 45°. With bevels of this kind, it is ensured that the tyre overlay will not catch on the road surfacing by an edge but will slide over smallish elevations on the road surfacing by virtue of the obliquely extending side face. For this purpose, the side faces are formed to follow a straight line in cross-section as far as possible, i.e. the side-faces are situated on surfaces forming the envelopes of cones. This has the advantage that the likelihood of the wheel fitted with the tyre overlay butting against the road surfacing when skidding sideways will remain the same throughout the life of the tyre overlay. By contrast, if the transition from the tread to the outer side-face of the flange were rounded, then as the tread was increasingly abraded the transition would more abruptly angle as the tyre overlay was increasingly worn away. The more abrupt the angle between the tread and the side-face, the greater is the risk of the wheel catching on the road surfacing by this abrupt edge. This produces impacts in the axial direction of the wheel which can be largely avoided by the preferred obtuse angle at the transition.

To fit a tyre overlay, it is drawn onto the tyre fitted on the rim while the tyre is not under pressure and the tyre is then pumped up. The tyre is advantageously pumped up hard, namely to 300 or 400 kPa for example.

BRIEF DESCRIPTION OF THE DRAWINGS

FIG. 3 is a schematic cross-section through a tyre having a tyre overlay as shown in FIG. 1.

FIG. 4 is a schematic cross-section through a tyre having a tyre overlay as shown in FIG. 2.

FIG. 5 is a schematic cross-section through a tyre having a tyre overlay having a lateral flange and longitudinal patterning.

FIG. 6 is a schematic cross-section through a tyre having a tyre overlay having very small lateral flanges and a longitudinally divided tread.

FIG. 7 is a schematic cross-section through a tyre having a tyre overlay having a lateral flange and a fabric inlay.

FIG. 8 is a schematic cross-section through a tyre having a tyre overlay having lateral flanges of metal and a longitudinally divided tread and having longitudinal patterning on each of the divided parts.

DETAILED DESCRIPTION OF THE EMBODIMENTS BY REFERENCE TO THE DRAWINGS

Figure 1:
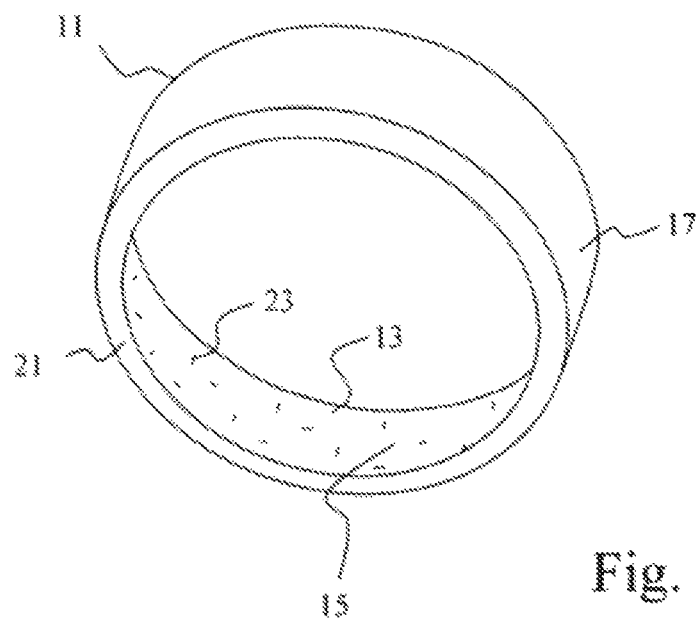
FIG. 1 is a perspective diagram of a tyre overlay of L-shaped cross-section.

The tyre overlay 11 which is shown schematically in FIG. 1 is annular. It has an overlay strip 13 which forms a tread 17 on the outside and a gripping surface 15 on its inside. Formed on one side of this overlay strip 13 is a flange 21. After the fitting process, this flange 21 usefully rests against the outer side of the tyre. Not only does this enable the tyre overlay to be fitted without taking the wheel off the car but it also forms an abutment in the preferred direction which stops the overlay strip from being displaced on the tyre. It has in fact been found that, in use, the tyre overlay tends to shift on the tyre from the outside inwards rather than from the inside outwards. Use therefore moves the flange into abutment with the side of the tyre.

The overlay strip 13 is formed to be of uniform thickness. Its diameter and width are matched to the dimensions of the tyre for which it is intended. The width is suitable for tyres of different widths because it merely has to ensure that the rolling face of the tyre cannot come into contact with the surfacing of the road. The thickness of the overlay strip may be between 4 mm and 35 mm. Preferred thicknesses are between 8 and 20 mm. In current models the thickness of the material is 20 mm. So that the tyre overlay stays held on the tyre, the gripping surface may be fitted with studs 23, edges or the like.

To allow the tyre overlay to be fixed on the tyre, the air is let out of the tyre sufficiently to enable the overlay strip 13 to be slid over the tyre. The tyre is then pumped up again. The pumping up increases the circumference of the tyre somewhat and the tyre overlay is thus held on the tyre in such a way as to be resistant to slipping. The connection between the tyre and the tyre overlay is improved by the elevations 23 on the gripping surface 15. What happens is that these dig into the tread of the tyre when the latter is inflated. To prevent any change in the lengthwise size of the overlay strip, it may be reinforced. Glass-fibres or plastics fibres may be incorporated as a reinforcement.

Figure 2:
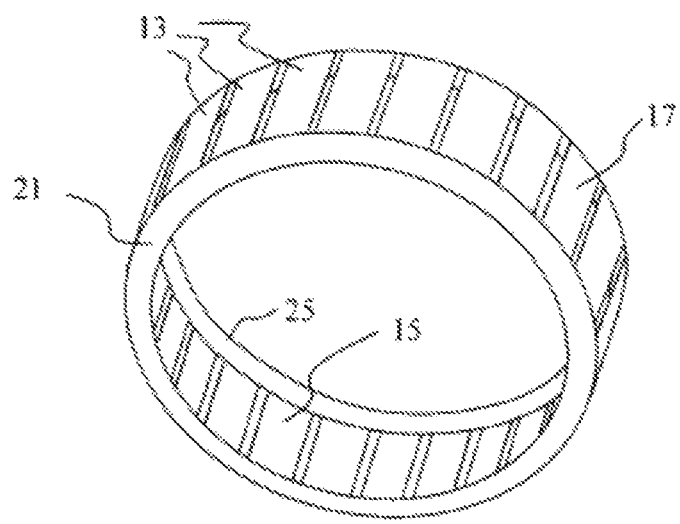
FIG. 2 is a perspective diagram of a tyre overlay of U-shaped cross-section having an interrupted tread.

However, the overlay strip need not be of a continuous form as shown in FIG. 1. It may also be of an interrupted form as shown in FIG. 2. However, for this purpose it is necessary for a surrounding ring to be provided at both ends of the interruptions which extend transversely to the direction of travel, which ring is able to withstand the tensile force on the tyre overlay which is generated when the tyre is inflated. This one or these two surrounding rings may take the form of flanges 21, 25. Shown in FIG. 2 is a tyre overlay of this kind having two flanges 21, 25. Like a snow-chain, these surrounding rings, or at least one of the two, may be formed to be closable and openable. The ring may also take the form of a wire rope. A tyre overlay of this kind has for example two wire ropes which can be opened and which can each be closed to form a ring. A plurality of strips is spread between these two wire ropes. These strips each form the tread on their outside and the gripping surface on their inside. Between the strips, there are interruptions at which the tyre can be seen. However, at the interruptions, the tyre lies beyond the tread of the tyre overlay by the thickness of the strip, which means that it cannot come into contact with the surfacing of the road. At the interruptions, the edges of the strips stop the tyre overlay from slipping relative to the tyre. The two lateral flanges or clamping rings stop the tyre overlay from being pulled off the tyre sideways due to forces which occur in use.

Some embodiments are shown in cross-section in FIGS. 3 to 8. It goes without saying that in amended representations the embodiments could be provided with a planar flange or a clamping-ring flange on both sides and that the overlay strip 13 could then be interrupted in the longitudinal direction. In each of the present representations the rim is designated 30 and the tyre 40. The tyre overlay is consistently designated 11 in the different embodiments.

In the embodiment shown in FIG. 3, the tyre overlay 11 is provided with a single flange 21 of a planar form. The tyre overlay can therefore be slid over the tyre 40 from the outside. R can be used for wider and narrower tyres. The flange 21 serves not only to allow the tyre overlay 11 to rest against the tyre laterally and thus not to shift relative to the tyre transversely to the direction of travel. Thanks to the fact that it takes the form of a planar member, the flange also serves more to give the tyre overlay stiffness. The consequence of this stiffness which is increased by virtue of the planar flange is that the tyre overlay 11 cannot be pressed flat in the region where it is in contact with the surface of the road. The area of contact with the road surfacing is therefore very small.

The elevations 23 take the form of teeth. These teeth are formed to be one-sided. Towards the flange 21 they have a steep side and away from the flange they have a shallowly-sloped side. The most that the tyre overlay 11 can therefore be displaced by pressures in the axial direction of the wheel is inwards (towards the right in the drawing), until the flange 21 rests against the side of the wheel. When there are forces acting in the opposite direction, the teeth hook into the rubber of the tyre. Should a slight shift occur nevertheless, it is cancelled out again when forces again act in the opposite direction. The wheel overlay therefore does not detach from the wheel in use.

What is certainly characteristic of skidding is that the wheel slides across the surface below transversely to its direction of travel. When this happens the tread 17 of the wheel overlay 11 slides transversely to the direction of travel of the wheel. So that impacts in this direction remain relatively small and the behaviour while skidding remains calculable, it is necessary for the wheel overlay 11 not to catch on the surface below. To encourage this, a side-face 27 which slopes down (or which slopes up from the surface below) obliquely is formed to continue on from the tread 11. The angle between the surface below and this side-face 27 is in the range of between 30 and 60°. The angle made by the material of the wheel overlay at this transition between the tread and the side-face 27 is therefore between 150 and 120°. Thanks to the obtuse-angled configuration at this point, the transition is designed always to remain the same regardless of the degree to which the tread is worn away and any catching of this edge on the surface below always remains equally unlikely.

There are two flanges 21, 25 present on the tyre overlay shown in FIG. 4. This tyre overlay is therefore made for a given width of tyre. It cannot be fitted to wider tyres. Fitting is more difficult because the width of the opening in the flanges is less than the diameter of a tyre which fits.

The tyre overlay shown in FIG. 5 once again has only the outer flange 21. The tyre overlay forms a patterned overlay strip 13. It is provided with traction-resistant reinforcements 29 made of two wire ropes or hanks of synthetic fibre. The tread is grooved in the direction of travel. At least initially, the contact area of the tyre overlay 11 on the road surfacing is therefore smaller than in the case of a non-patterned tread. As wear increases however, the tread becomes less patterned. The reinforcement 29 stops the tyre overlay from stretching and thus its diameter from enlarging and the connection between the tyre overlay and the tyre from becoming looser.

The tyre overlay 11 shown in FIG. 6 is also a case where two flanges 21, 25 are present. The reinforcement is distributed within the thickness of the material of the overlay strip. The overlay strip is divided into two rings. The two can be arranged on the tyre independently of one another. They may also be partly connected together. Teeth 23 as shown in FIG. 3 may be provided.

In the embodiment shown in FIG. 7, an overlay strip 13 is once again provided with one outer flange 21. This overlay strip stays held in place simply by virtue of the friction between the tyre and the gripping surface of the tyre overlay. The tyre overlay is provided with a fabric reinforcement 29. To increase the grip between the tyre overlay and the tyre, the gripping surface 15 of the overlay may be made rough by sprinkling-in carborundum.

Finally, in the embodiment shown in FIG. 8 there is a retaining structure 33 formed after the fashion of a snow-chain. To it are fixed bodies for skidding 31 which form the tread 17. This tyre overlay can be tensioned like a snow-chain, for which reason it can be fitted without the tyre pressure needing to be reduced and increased again. The retaining structure 33 forms in this case two lateral flanges 21, 25 which stop the tyre overlay 11 from slipping in the direction of the axis of the wheel.

It will at once be apparent that the different features of the embodiments shown can be combined with one another almost as desired. These embodiments therefore have to be seen as an indication of the variety of modifications which are possible to tyre overlays of this kind and not in any way as limiting the scope of the independent claim, which is drafted in general terms.

To sum up, the invention can be described as an annular tyre overlay 11 for drawing onto the rolling surface of tyres 40, which has a tread 17 on its outside and a gripping surface 15 on its inside and which is so designed that contact between the rolling surface of the tyre 40 and the surfacing of the road is prevented by the tyre overlay 11 when the tyre overlay has been drawn onto a tyre. The said tyre overlay 11 is provided with a flange 21 which stops the tyre overlay 11 from shifting in one sense in the axial direction of the wheel. Advantageously, the tyre overlay is additionally stiffened by a flange 21 of planar form to keep the contact area on the surface below small.

I claim:

1. An annular tyre overlay for drawing onto a rolling surface of a tyre which fits the annular tyre overlay comprising an overlay strip having a tread surface on the outside, and a gripping surface on the inside, wherein the overlay strip is designed such that contact between the rolling surface of the tyre and a road surface is prevented by the overlay strip when the tyre overlay has been drawn onto the tyre, wherein a flange continuing on from the overlap strip is present which can be brought into abutment with the side of the tyre, wherein the overlay strip comprises a plastics material which generates substantially less friction against asphalt than it does against rubber, wherein the gripping surface is patterned, wherein the patterning of the gripping surface is configured to prevent displacement of the tyre overlay in a first axial direction which would cause an increase in a distance between the flange and the tyre, wherein the patterning of the gripping surface has teeth which have a steep side and a shallowly-sloped side, wherein the steep side prevents displacement of the tyre overlay in the first axial direction, wherein the shallowly-sloped side permits a displacement of the tyre overlay in a second axial direction opposite to the first axial direction, which causes a decrease in the distance between the flange and the tyre, and wherein the tread surface is non-patterned or patterned so that the contact area of the tyre overlay on the road surface is smaller than that of a non-patterned tread surface.

2. The annular tyre overlay of claim 1, wherein the overlay strip comprises traction-resistant reinforcements.

3. The annular tyre overlay of claim 2, wherein the traction resistant reinforcements comprise at least two wire ropes or hanks and wherein the traction resistant reinforcements stop the tyre overlay from stretching and thus its diameter from enlarging and the connection between the tyre overlay and the tyre from becoming loose.

4. The annular tyre overlay of claim 2, wherein the traction resistant reinforcements comprise fabric reinforcement.

5. The annular tyre overlay of claim 1, wherein the annular tyre overlay is U-shaped in form in cross-section, such that there are two flanges laterally of the tread surface.

6. The annular tyre overlay of claim 1, further comprising a side face connecting the overlay strip to the flange, wherein an angle between the side face and the overlay strip is in a range of between 30° and 60°.

7. The annular tyre overlay of claim 1, wherein the tread surface is non-patterned.

8. An annular tyre overlay for drawing onto the rolling surface of a tyre which fits the annular tyre overlay comprising an overlay strip having a tread on the outside, and a gripping surface on the inside, wherein the overlay strip is designed such that contact between the rolling surface of the tyre and the surface of the road is prevented by the overlay strip when the tyre overlay has been drawn onto the tyre, wherein the overlay strip is divided into two rings capable of being arranged on the tyre parallel to and, optionally, independently of one another, wherein each ring of the overlay strip has a corresponding flange and each flange can be brought into abutment with the corresponding side of the tyre, wherein the overlay strip comprises a plastics material which generates substantially less friction against asphalt than it does against rubber, wherein the gripping surface is patterned, wherein the patterning of the gripping surface is configured to prevent displacement of the tyre overlay in a first axial direction which would cause an increase in a distance between the flange and the tyre, wherein the patterning of the gripping surface has teeth which have a steep side and a shallowly-sloped side, wherein the steep side prevents displacement of the tyre overlay in the first axial direction, and wherein the shallowly-sloped side permits a displacement of the tyre overlay in a second axial direction opposite to the first axial direction, which causes a decrease in the distance between the flange and the tyre.

9. The annular tyre overlay of claim 8, wherein two rings of the overlay strip are partly connected together.

10. The annular tyre overlay of claim 8, wherein a reinforcement is distributed within the thickness of the material of the overlay strip.

11. The annular tyre overlay of claim 8, further comprising two side faces, each side face connecting one of the rings of the divided overlay strip to the corresponding flange, wherein an angle between the side face and the corresponding ring of the overlay strip is in a range of between 30° and 60°.

12. The annular tyre overlay of claim 8, wherein each flange is formed by a snow chain-like retaining structure.

* * * * *